W. W. COOK.
Sulky-Harrow.
No. 224,650.   Patented Feb. 17, 1880.
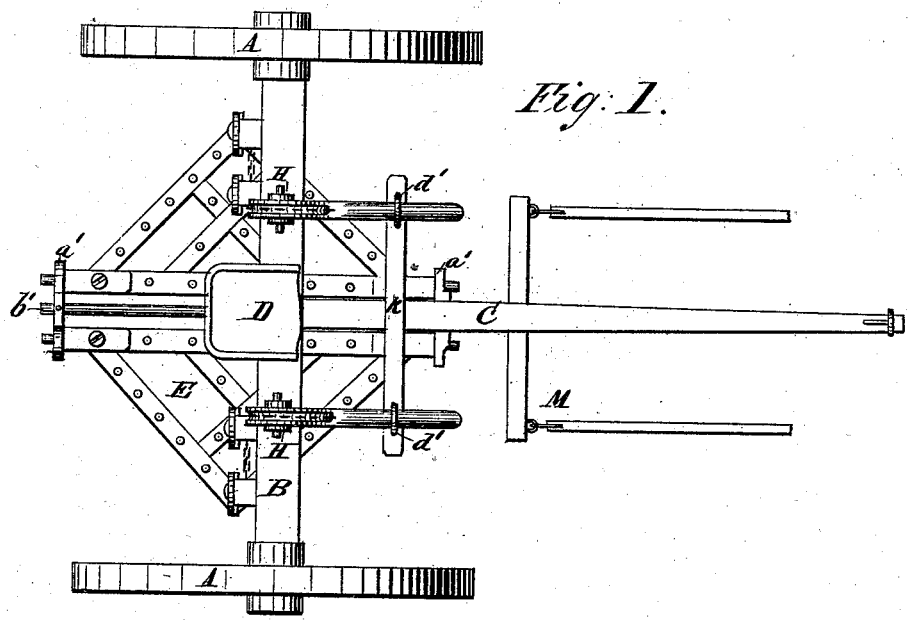
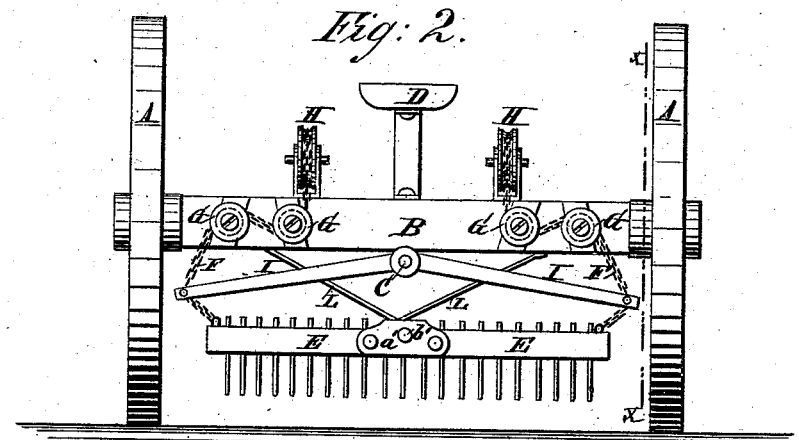
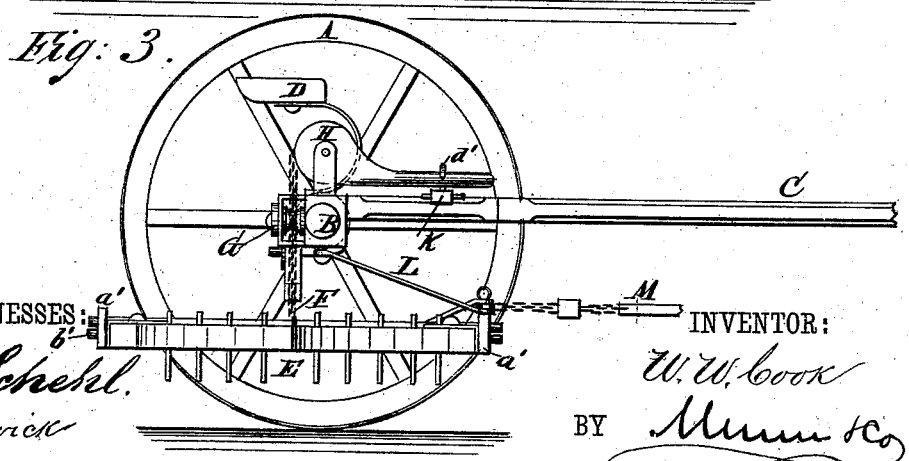
WITNESSES:
A. Schehl.
C. Sedgwick
INVENTOR:
W. W. Cook
BY Munn & Co
ATTORNEYS.

UNITED STATES PATENT OFFICE.

WILLIAM W. COOK, OF KANSAS CENTRE, KANSAS.

SULKY-HARROW.

SPECIFICATION forming part of Letters Patent No. 224,650, dated February 17, 1880.

Application filed August 7, 1879.

*To all whom it may concern:*

Be it known that I, WILLIAM WASHINGTON COOK, of Kansas Centre, in the county of Rice and State of Kansas, have invented a new and Improved Sulky-Harrow, of which the following is a specification.

Figure 1 is a plan of the harrow. Fig. 2 is a rear elevation of the same. Fig. 3 is a sectional elevation of the same on line $xx$, Fig. 2. Similar letters of reference indicate corresponding parts.

The object of this invention is to provide a harrow that can be readily adjusted for light or heavy work, be made to accommodate itself to uneven ground, and be moved anywhere without being taken to pieces.

The invention consists of a harrow made in two equal triangular parts, hinged together at their bases and suspended from an axle by ropes or chains that are attached to their extreme angles and pass upward over sheaves, to be made fast on cam-levers that are mounted on the axle; and it further consists of two pivoted stretchers that, engaging in the chains or ropes, serve to keep the two parts of the harrow on a horizontal level when it may be raised or lowered.

In the drawings, A represents the wheels, B the axle, C the pole, and D the driver's seat, of the sulky. E is the harrow, in two like parts, hinged together in the plates $a'$, with the strengthening-rod $b'$ between them. F F are the chains, made fast to the outer angles of the harrow and made to pass upward over the sheaves G G, that are secured to the rear face of the axle, to be fastened to the cam-levers H, that are secured on the top of the axle. I I are the stretchers, pivoted to the axle at $C'$ and having their points engaged with the chains. K is the hook-plate carrying the hooks $d'$, that serve, when it may be desired, to hold the handles of the cam-levers. L is a brace that serves to steady the harrow when it is in operation.

It will be seen that by operating the levers H the harrow can be raised or lowered at will, according to the work to be done with it, and that either half of it can rise or fall independently of the other to accommodate itself to the inequalities of the ground, and in rough ground, heavy stubble, or corn-stalks either side can readily be raised and cleaned, and by the chains it can be raised so that it can be transported anywhere.

M is the single-tree, that may be used at any time to draw the harrow when it is not desired to use the wheels and axle.

Having thus fully described my invention, I claim as new and desire to secure by Letters Patent—

1. The combination, with the axle B, of the harrow E, chains F, sheaves G, cam-levers H, and stretchers I, as and for the purpose described.

2. The stretchers I, in combination with the chains F and harrow E, substantially as herein shown and described.

3. The hinged harrow-sections E H, brace-bars L, chains F, cam-levers H, axle B, sheaves G, and pivoted stretchers I, all substantially as set forth.

WILLIAM WASHINGTON COOK.

Witnesses:
F. W. CASTHOLM,
N. CHRISTENSEN.